(12) United States Patent
Hong et al.

(10) Patent No.: US 8,735,533 B2
(45) Date of Patent: May 27, 2014

(54) POLYMERIC VIOLET ANTHRAQUINONE COLORANT COMPOSITIONS AND METHODS FOR PRODUCING THE SAME

(75) Inventors: Xiaoyong Michael Hong, Greer, SC (US); Robert L Mahaffey, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 396 days.

(21) Appl. No.: 12/624,646

(22) Filed: Nov. 24, 2009

(65) Prior Publication Data

US 2011/0124837 A1  May 26, 2011

(51) Int. Cl.
*C08G 16/00* (2006.01)
*C09B 1/50* (2006.01)
*C09B 1/54* (2006.01)

(52) U.S. Cl.
USPC ........... 528/226; 528/220; 528/228; 528/391; 528/397; 528/485; 528/489; 260/372; 260/373; 260/376; 260/380

(58) Field of Classification Search
USPC ................. 528/226, 220, 397, 391, 489, 485; 260/372, 373, 376, 380
See application file for complete search history.

(56) References Cited

U.S. PATENT DOCUMENTS

| | | | |
|---|---|---|---|
| 1,881,752 A | 10/1932 | Lodge et al. | |
| 2,014,810 A | 9/1935 | Lodge et al. | |
| 2,117,569 A | 5/1938 | Peter et al. | |
| 3,192,117 A | 6/1965 | Kaiser et al. | |
| 3,689,510 A | 9/1972 | Kolliket et al. | 260/376 |
| 3,894,060 A | 7/1975 | Hederich | |
| 4,137,243 A | 1/1979 | Farmer | 260/378 |
| 4,224,228 A | 9/1980 | Adam | 260/372 |
| 4,244,691 A | 1/1981 | Adam | 8/676 |
| 4,284,729 A | 8/1981 | Cross et al. | 521/158 |
| 2,580,190 A | 10/1981 | Adam | 260/372 |
| 4,294,768 A | 10/1981 | Adam | 260/372 |
| 4,640,690 A | 2/1987 | Baumgartner et al. | 8/506 |
| 4,732,570 A | 3/1988 | Baumgartner et al. | 8/506 |
| 4,812,141 A | 3/1989 | Baumgartner et al. | 524/190 |
| 4,846,846 A | 7/1989 | Reekers et al. | 8/515 |
| 5,300,475 A | 4/1994 | Takuma et al. | 503/227 |
| 5,770,552 A | 6/1998 | Bruhnke | 510/343 |
| 5,770,557 A | 6/1998 | Bruhnke | 510/515 |
| 6,022,944 A | 2/2000 | Weaver et al. | 528/391 |
| 6,426,416 B1 | 7/2002 | Weaver | |
| 6,593,482 B2 | 7/2003 | Bouchard et al. | 549/510 |
| 6,593,483 B2 | 7/2003 | Xia | 552/259 |
| 6,635,350 B2 | 10/2003 | Connor et al. | 428/411.1 |
| 2005/0204484 A1 | 9/2005 | Meder | |

FOREIGN PATENT DOCUMENTS

| | | | | |
|---|---|---|---|---|
| FR | 1150966 | 1/1958 | | |
| GB | 859283 | 1/1961 | | 2/4 |
| GB | 1159.683 | 7/1969 | | |
| WO | 2009/090124 | 7/2009 | | 69/10 |

OTHER PUBLICATIONS

International Search Report Application No. PCT/US2010/057150. Date of Mailing Mar. 9, 2011.
J. Chem. Eng. Dara 1984, 29, 482-483. David Ukponmwam:Physical Characteristics of Synthesized 1-Amino-7 (arylamino) anthraquinone 2-Ether Dyes for Synthetic-Polymer Fibers.
J. Chem. Eng. Dara 1987, 32, 282-284. David Ukponmwam:Physical Characteristics of Synthesized 1-4 Bis (arylamino) -2-(aryloxy) anthraquinone Dyes for Synthetic-Polymer Fibers.

*Primary Examiner* — Duc Truong
(74) *Attorney, Agent, or Firm* — Brenda D. Wentz

(57) ABSTRACT

This invention relates to polymeric violet anthraquinone colorants having at least one poly(oxyalkylene) chain attached to an anthraquinone structure. Such colorants exhibit bright violet shade, excellent compatibility with organic media or aqueous systems, good lightfastness, and excellent thermal stability. The water soluble poly(oxyalkylene) substituted polymeric violet anthraquinone colorants also possess high water solubility, high color strength, non-staining properties, and high pH stability. The processes and methods for making such polymeric violet anthraquinone colorants and their use for coloring consumer products are also provided.

7 Claims, No Drawings

POLYMERIC VIOLET ANTHRAQUINONE COLORANT COMPOSITIONS AND METHODS FOR PRODUCING THE SAME

FIELD OF THE INVENTION

This invention relates to compositions of polymeric violet anthraquinone colorants, to processes for making the compositions, and also to the use of the compositions thus prepared for coloring consumer products. The colorants are generally characterized as being water soluble, non-staining and pH stable.

BACKGROUND OF THE INVENTION

Anthraquinone dyes have been widely used to dye fabrics, such as cotton, polyester, acrylic, wool, cellulose acetate, nylon, and the like, due to their excellent light fastness, uniform leveling, dye bath stability, and shade brilliancy. Anthraquinones are also well known for use as coloring agents for providing coloration to oils, drugs, cosmetic products, paper, rubber, printing inks, plastics, coatings, leather, waxes, and detergents. These types of anthraquinone dyes may be classified as acid dyes, disperse dyes, vat dyes, metallizable dyes, direct dyes, solvent dyes, basic dyes, reactive dyes, and the like.

Many violet anthraquinone dyes are known. Commercially available examples of violet anthraquinone dyes include Acid Violet 39, Acid Violet 41, Acid Violet 42, Acid Violet 43, Acid Violet 48, Acid Violet 51, Acid Violet 34, Acid Violet 47, Acid Violet 109, Acid Violet 126, Basic Violet 24, Basic Violet 25, Disperse Violet 1, Disperse Violet 4, Disperse Violet 26, Disperse Violet 27, Disperse Violet 28, Disperse Violet 57, Solvent Violet 11, Solvent Violet 13, Solvent Violet 14, Solvent Violet 26, Solvent Violet 28, Solvent Violet 31, Solvent Violet 36, Solvent Violet 37, Solvent Violet 38, Solvent Violet 48, Solvent Violet 59, Solvent Violet 60, Vat Violet 13, Vat Violet 15, Vat Violet 16. However, these violet anthraquinone dyes are not polymeric in nature, and they tend to exhibit stability, gelling and precipitation challenges when incorporated into other formulations, such as detergent formulations and other consumer cleaning products. Furthermore, the water soluble violet anthraquinone dyes, such as acid violet dyes, are known to cause staining to textile substrates (such as fabrics), skin, and other surfaces. Thus, they are not suitable for use in applications where non-staining colorants are desired, such as in washable markers and paints and in cleaning formulations such as laundry detergents and fabric softeners.

Furthermore, these anthraquinone violet dyes are generally provided in powder form which is often difficult to handle. While these dyes may be made into liquid form by dissolving the dye in water or organic liquid, the solubility of such liquid dyes is low and the resulting liquid dye solutions tend to have very low color strength. Color strength, or color value, is determined using a modified version of AATCC Test Method 182-2000 wherein the color value is determined and calculated on the absorbance of a 1 gram per liter through a one centimeter cell length of the colorant, in the appropriate solvent, by UV-vis spectroscopy.

Attempts by others to make violet anthraquinone colorants include U.S. Pat. No. 3,192,117 to Kaiser et al., which provides some examples of violet anthraquinone compositions useful as hair dyes. These colorants exhibit good dyeing ability when they are incorporated into the dyeing creams or pastes. Similar to the acid dyes described above, these compositions cause staining to the substances to which they are applied. In this instance, it is desirable to use staining anthraquinone colorants for dyeing human hair. Thus, the colorants taught by Kaiser et al. are not polymeric in nature, and they are not non-staining. Additionally, the colorants taught by Kaiser et al. preferably contain two nitrogen-containing primary groups on the anthraquinone radical.

U.S. Pat. Nos. 1,881,752 and 2,014,810 to Lodge et al., U.S. Pat. No. 2,117,569 to Peter and U.S. Pat. No. 2,580,190 to Peter et al. described several anthraquinone dyestuffs, including anthraquinone violet dyes. U.S. Pat. No. 3,689,510 to Kolliker et al. describes a class of water soluble anthraquinone dyes with an —O—COOR group in at least one β-position. These dyes may be used for dyeing synthetic polyester fibers and exhibit good fastness to light and sublimation. U.S. Pat. No. 3,715,373 to Andrews disclosed a process to prepare 1,4-diamino-2-alkoxy or phenoxy anthraquinone dyestuffs from an acyl-substituted 1,4-diamino-2-haloanthraquinone in a inert solvent. David O. Ukponmwan and et al. in *J. Chem. Eng. Data* 1984, Vol. 29, pp. 482-483 and 1987, Vol. 32, pp 282-284, synthesized a series of 1-amino-4-(arylamino)anthraquinone 2-ether and 1,4-Bis(arylamino)-2-(aryloxy)anthraquinone dyes used for dyeing synthetic polymer fibers. However, these references teach the manufacture of small molecule anthraquinone dyes. Thus, no teaching or fair suggestion of polymeric versions of such dyestuffs is known, nor is it taught or fairly suggested that these colorants could be used for coloring consumer products.

Great Britain Patent No. 859,283 teaches water soluble anthraquinone dyestuffs useful for dyeing fibers, leather and paper. The water solubility is introduced by sulfonic acid, sulfuric, or carboxylic acid groups on the anthraquinone dye molecule. These are small molecules which contain triazine units and ionic groups to make them water soluble. These dyes are also generally blue in nature.

Other anthraquinone colorants, such as 1,4-disubstituted aliphatic aminoanthraquinones, are disclosed in U.S. Pat. No. 4,846,846 to Rekers et al. wherein anthraquinones were prepared from a mixture of quinizarin, leucoquinizarin, and amine in water followed by various purification procedures. The preferred amines are sec-alkyl primary amines with terminal reactive groups, such as —OH, —NH$_2$, or —SH, on the end of the amine moiety. These anthraquinone colorants are used to color polyurethane resins, particularly foams.

U.S. Pat. No. 4,137,243 to Farmer discloses polymeric anthraquinone colorants with terminal amino groups from leucoquinizarin and polymeric diamines. The leucoquinizarin can be generated in-situ by reduction of quinizarin with sodium hydrosulfite. The polymeric aminoanthraquinone colorants prepared according to the above patent processes tend to contain high levels of impurities, such that further purification is needed to obtain higher purity anthraquinone colorants. Purification of low melting or liquid water-soluble anthraquinone colorants usually involves time consuming extraction and washing procedures that often require organic solvents, which generally are not environmentally friendly. Additionally, these solvents are typically not suitable for use in many consumer product applications and complete removal is required. The organic solvents are often expensive and generate additional waste during production of the anthraquinone colorants. Furthermore, some of the impurities in these anthraquinone colorants are often difficult to filter and generally cause dull color, shade shift, and staining.

U.S. Pat. Nos. 4,224,228 and 4,244,691 to Adam disclose water soluble anthraquinone dyes in the form of free acid having one or more —SO$_3$H group on the anthraquinone conjugated system. These anthraquinone dyes are used for dyeing or printing textile materials, such as natural and synthetic polyamide fibers, and exhibit good dye uptake and fastness to wet-processing. Optionally, these anthraquinone dyes have fiber-reactive groups, such as acryloyl, vinylsulfonyl, chloroacetyl, fluorotriazinyl radicals, and bromoacryloyl groups.

U.S. Pat. No. 6,022,944 to Weaver et al. discloses colored anthraquinone or condensed anthraquinone compounds with one or more sulfonamido linkages and poly(oxyalkylene) moieties. These colorants exhibit improved water dispersibility and compatibility with other organic compounds. However, the process to make these colorants involves adding one or more —SO$_2$Cl groups on the conjugated rings, which is difficult and involves hard-to-handle reagents.

U.S. Pat. No. 6,593,483 to Xia describes a polymeric blue anthraquinone colorant, wherein a poly(oxyalkylene) chain is attached to the 1-position, or/and the 4-position through aromatic amino group(s) on an anthraquinone backbone. U.S. Pat. No. 6,635,350 to Connor et al. discloses a polymeric red anthraquinone colorant, where at least one poly(oxyalkylene) chain is attached to the 1-position, as well as at least one poly(oxyalkylene) chain is attached to either the 5-position or the 8-position of an anthraquinone backbone.

Thus, there is a need for a polymeric violet anthraquinone colorant that exhibits excellent light and pH stability, that is compatible with other materials, and that is suitable for use in coloring various consumer products. The colorant is also desirably non-staining and water soluble with bright shades.

Accordingly, one object of this invention is to provide a polymeric violet anthraquinone colorant, preferably a 1,4-diamino-2-polyalkyleneoxy violet anthraquinone colorant, that exhibits bright shades, high pH stability, good light fastness and compatibility with other materials. Another object of this invention is to provide methods to make such anthraquinone colorants. A further object of this invention is to use these inventive colorants for coloration of consumer products, such as liquid and solid laundry detergents and liquid fabric softeners.

SUMMARY OF THE INVENTION

Provided herein is a polymeric violet anthraquinone colorant comprising a compound represented by structure (I):

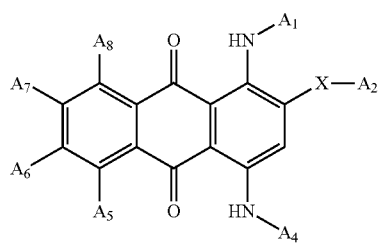

wherein:
$A_1$ is selected from the group consisting of hydrogen, alkyl, hydroxyalkyl, polyoxyalkylene, and aryl;
X is a linking group and is selected from the group consisting of oxygen and sulfur;
$A_2$ is selected from the group consisting of alkyl or aryl having no polymer chains; a polyoxyalkylene moiety or an aryl linked polyoxyalkylene moiety with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl;

$A_3$ is a polyoxyalkylene moiety terminated with a hydroxyl or alkyl or aryl group;

$A_4$ is selected from the group consisting of hydrogen; an aryl group that is optionally substituted with alkyl, polyoxyalkylene, or sulfonate moieties, or combinations thereof; an alkyl group that is optionally substituted with polyoxyalkylene, hydroxyl, alkoxyl, carboxylic acid or ester, sulfonate, or sulfate groups; and a cyclohexyl group that is optionally substituted with one or more alkyl or polyoxyalkylene groups; and $A_5$-$A_8$ are independently selected from the group consisting of hydrogen, halogen, nitro, amino, alkylamino, arylamino moieties, and combinations thereof.

Also provided herein is a polymeric violet anthraquinone colorant comprising a compound represented by structure (IV):

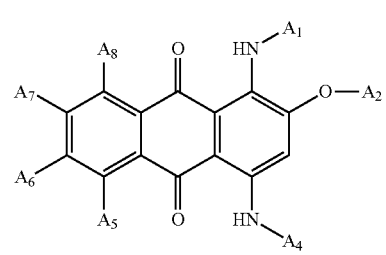

wherein:
$A_1$ is selected from the group consisting of hydrogen, alkyl, hydroxyalkyl, polyoxyalkylene, and aryl;
$A_2$ is selected from the group consisting of alkyl or aryl having no polymer chains; a polyoxyalkylene moiety or an aryl linked polyoxyalkylene moiety with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl;

$A_3$ is a polyoxyalkylene moiety terminated with a hydroxyl or alkyl or aryl group;

$A_4$ is selected from the group consisting of hydrogen; an aryl group that is optionally substituted with alkyl, polyoxyalkylene, or sulfonate moieties, or combinations thereof; an alkyl group that is optionally substituted with polyoxyalkylene, hydroxyl, alkoxyl, carboxylic acid or ester, sulfonate, or sulfate groups; and a cyclohexyl group that is optionally substituted with one or more alkyl or polyoxyalkylene groups; and $A_5$-$A_8$ are independently selected from the group consisting of hydrogen, halogen, nitro, amino, alkylamino, arylamino moieties, and combinations thereof.

Further provided herein is a polymeric violet anthraquinone colorant, wherein the colorant comprises a compound represented by structure (IV-B):

(IV-B)

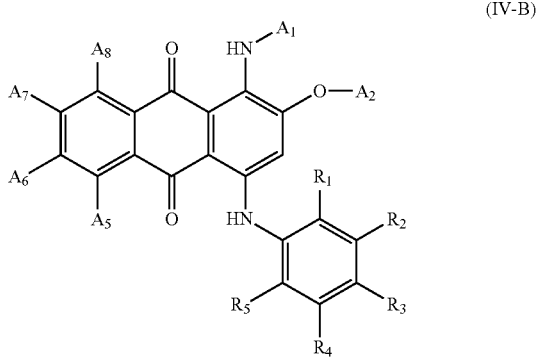

wherein:
- $A_1$ is selected from the group consisting of hydrogen, alkyl, hydroxyalkyl, polyoxyalkylene, and aryl;
- $A_2$ is selected from the group consisting of alkyl or aryl having no polymer chains; a polyoxyalkylene moiety, or an aryl linked polyoxyalkylene moiety, terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl;
- $A_3$ is a polyoxyalkylene moiety terminated with a hydroxyl or alkyl or aryl group;
- $R_1$, $R_2$, $R_3$, $A_4$, and $R_5$ are independently selected from the group consisting of hydrogen, $C_1$-$C_{20}$ alkyl, $C_1$-$C_{20}$ alkoxy, and Q-E, wherein Q is a linking group selected from the group consisting of N, O, S, $SO_2$, $SO_3$, $CO_2$, $SO_2N$, alkyl, and alkoxy, and E is a polymer chain and end group that conforms to the structure of general formula (VI), as shown below:

[polyoxyalkyene constituent]$_z$R'     (VI)

wherein z is 1 or 2;
wherein the polyoxyalkylene constituent is selected from the group consisting of one or more monomers selected from a $C_{2-20}$ alkyleneoxy group, a glycidol group, a glycidyl group, or mixtures thereof;
wherein R' is an end group selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-23}$ alkylthio, $C_{1-20}$ alkylsulfonyl, $C_{1-20}$ alkylphenyl, phosphonyl, $C_{1-20}$ alkylphosphonyl, $C_{1-20}$ alkoxycarbonyl, and phenylthio; wherein at least one of $R_1$, $R_2$, $R_3$, $R_4$, $R_5$ is Q-E; and
$A_5$-$A_8$ are independently selected from the group consisting of hydrogen, halogen, nitro, amino, alkylamino, arylamino moieties, and combinations thereof.

Additionally provided herein is a method for making a polymeric violet anthraquinone colorant comprising the sequential steps of: (a) reacting bromamine acid with a polyoxyalkylene substituted primary aromatic or aliphatic amine in the presence of a copper-containing catalyst compound to form 1-amino-4-arylamino-2-anthraquinone sulfonic acid, and (b) reacting the anthraquinone of step "a" with an alcohol, a polymeric alcohol, a thiol, or a polymeric thiol and with a base to form 1-amino-2-polyalkyleneoxy-4-arylamino-anthraquinone, methyl ether.

DESCRIPTION OF THE INVENTION

All U.S. and foreign patents and U.S. patent applications disclosed in this specification are hereby incorporated by reference in their entirety.

The terms "polyalkyleneoxy" and "poly(oxyalkylene)," as used interchangeably herein, generally refer to molecular structures containing the following repeating units: —$CH_2CH_2O$—, —$CH_2CH_2CH_2O$—, —$CH_2CH_2CH_2CH_2O$—, —$CH_2CH(CH_3)O$—, —$CH_2CH_2CH(CH_3)O$—, and any combinations thereof. Furthermore, the polyoxyalkylene constituent may be selected from the group consisting of one or more monomers selected from a $C_{2-20}$ alkyleneoxy group, a glycidol group, a glycidyl group, or mixtures thereof.

The term "alkyl," as used herein, is intended to encompass any straight or branched alkyl moiety having from 1 to 30 carbon atoms.

The term "anthraquinone," as used herein, generally refers to the following general chemical structure and numbering sequence:

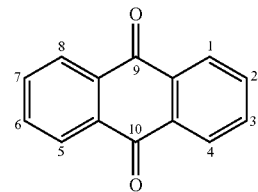 [SMILES: O=C1c2ccccc2C(=O)c2ccccc21]

The term "violet," as used herein, is generally intended to refer to compounds that exhibit a maximum absorbance in the visible spectrum in the wavelength range of about 550 nanometers to about 610 nanometers.

The polymeric violet anthraquinone colorant of the present invention may be represented by general structure (I):

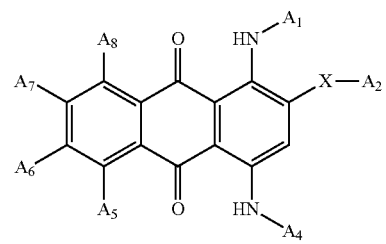

(I)

wherein:
- $A_1$ is selected from the group consisting of hydrogen, alkyl, hydroxyalkyl, polyoxyalkylene, and aryl;
- X is a linking group and is selected from the group consisting of oxygen and sulfur;
- $A_2$ is selected from the group consisting of alkyl or aryl having no polymer chains; a polyoxyalkylene moiety or an aryl linked polyoxyalkylene moiety with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl;
- $A_3$ is a polyoxyalkylene moiety terminated with a hydroxyl or alkyl or aryl group;

$A_4$ is selected from the group consisting of hydrogen; an aryl group that is optionally substituted with alkyl, polyoxyalkylene, or sulfonate moieties, or combinations thereof; an alkyl group that is optionally substituted with polyoxyalkylene, hydroxyl, alkoxyl, carboxylic acid or ester, sulfonate, or sulfate groups; and a cyclohexyl group that is optionally substituted with one or more alkyl or polyoxyalkylene groups; and $A_5$-$A_8$ are independently selected from the group consisting of hydrogen, halogen, nitro, amino, alkylamino, arylamino moieties, and combinations thereof.

Additional embodiments of the polymeric violet anthraquinone colorant of the present invention are represented by the general structures shown below:

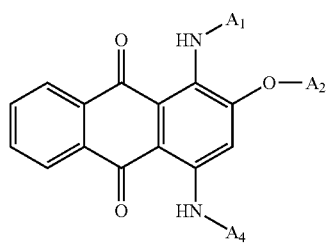

(II)

wherein:

$A_1$ is selected from the group consisting of hydrogen, alkyl, hydroxyalkyl, polyoxyalkylene, and aryl;

$A_2$ is selected from the group consisting of alkyl or aryl having no polymer chains; a polyoxyalkylene moiety, or an aryl linked polyoxyalkylene moiety, with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl; $A_3$ is a polyoxyalkylene moiety terminated with a hydroxyl or alkyl or aryl group; and $A_4$ is an aryl group that is optionally substituted with alkyl, polyoxyalkylene, or sulfonate moieties, or combinations thereof.

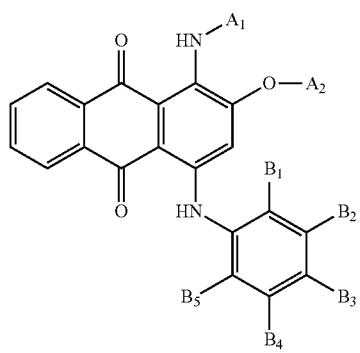

(II-A)

wherein:

$A_1$ is selected from the group consisting of hydrogen, alkyl, hydroxyalkyl, polyoxyalkylene, and aryl;

$A_2$ is selected from the group consisting of alkyl or aryl having no polymer chains; a polyoxyalkylene moiety, or an aryl linked polyoxyalkylene moiety, with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl; $A_3$ is a polyoxyalkylene moiety terminated with a hydroxyl or alkyl or aryl group; and $B_1$-$B_5$ are independently selected from the group consisting hydrogen, methyl, and sulfonate moieties, and combinations thereof.

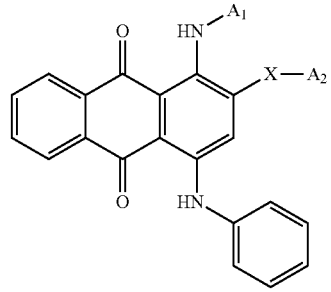

(III)

wherein:

$A_1$ is selected from the group consisting of hydrogen, alkyl, hydroxyalkyl, polyoxyalkylene, and aryl;

X is a linking group and is selected from the group consisting of oxygen and sulfur; and $A_2$ is selected from the group consisting of alkyl or aryl having no polymer chains; a polyoxyalkylene moiety, or an aryl linked polyoxyalkylene moiety, with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl; and $A_3$ is a polyoxyalkylene moiety terminated with a hydroxyl or alkyl or aryl group.

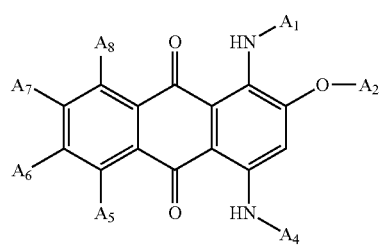

(IV)

wherein:

$A_1$ is selected from the group consisting of hydrogen, alkyl, hydroxyalkyl, polyoxyalkylene, and aryl;

$A_2$ is selected from the group consisting of alkyl or aryl having no polymer chains; a polyoxyalkylene moiety or an aryl linked polyoxyalkylene moiety with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl;

$A_3$ is a polyoxyalkylene moiety terminated with a hydroxyl or alkyl or aryl group;

$A_4$ is selected from the group consisting of hydrogen; an aryl group that is optionally substituted with alkyl, polyoxyalkylene, or sulfonate moieties, or combinations thereof; an alkyl group that is optionally substituted with polyoxyalkylene, hydroxyl, alkoxyl, carboxylic acid or ester, sulfonate, or sulfate groups; and a cyclohexyl group that is optionally substituted with one or more alkyl or polyoxyalkylene groups; and $A_5$-$A_8$ are independently selected from the group consisting of hydrogen, halogen, nitro, amino, alkylamino, arylamino moieties, and combinations thereof.

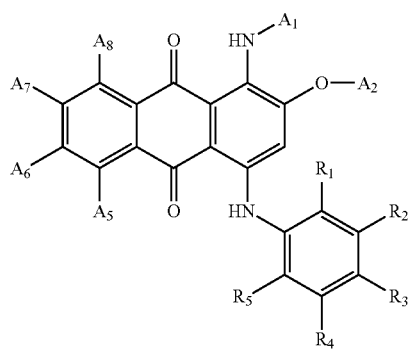

(IV-A)

wherein:

$A_1$ is selected from the group consisting of hydrogen, alkyl, hydroxyalkyl, polyoxyalkylene, and aryl;

$A_2$ is selected from the group consisting of alkyl or aryl having no polymer chains; a polyoxyalkylene moiety, or an aryl linked polyoxyalkylene moiety, having greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl;

$A_3$ is a polyoxyalkylene moiety terminated with a hydroxyl or alkyl or aryl group;

$R_1$, $R_2$, $R_3$, $R_4$, and $R_5$ are independently selected from the group consisting of hydrogen, $C_1$-$C_{20}$ alkyl, $C_1$-$C_{20}$ alkoxy, and Q-E, wherein Q is a linking group selected from the group consisting of N, O, S, $SO_2$, $SO_3$, $CO_2$, $SO_2N$, alkyl, and alkoxy, and E is a polymer chain and end group that conforms to the structure of general formula (VI), as shown below:

[polyoxyalkyene constituent]$_Z$R'    (VI)

wherein z is 1 or 2;
wherein the polyoxyalkylene constituent is selected from the group consisting of one or more monomers selected from a $C_{2-20}$ alkyleneoxy group, a glycidol group, a glycidyl group, or mixtures thereof;

wherein R' is an end group selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsulfonyl, $C_{1-20}$ alkylphenyl, phosphonyl, $C_{1-20}$ alkylphosphonyl, $C_{1-20}$ alkoxycarbonyl, and phenylthio; wherein at least one of $R_1$, $R_2$, $R_3$, $R_4$, $R_5$ is Q-E; and $A_5$-$A_8$ are independently selected from the group consisting of hydrogen, halogen, nitro, amino, alkylamino, arylamino moieties, and combinations thereof.

Preferably, Q is oxygen, E is a polyoxyalkylene moiety consisting of ethylene oxide and propylene oxide monomers, and z is 1.

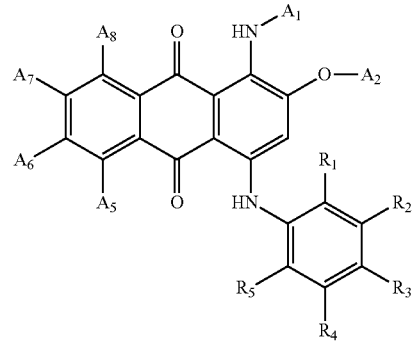

(IV-B)

wherein:

$A_1$ is selected from the group consisting of hydrogen, alkyl, hydroxyalkyl, polyoxyalkylene, and aryl;

$A_2$ is selected from the group consisting of alkyl or aryl having no polymer chains; a polyoxyalkylene moiety, or an aryl linked polyoxyalkylene moiety, terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl;

$A_3$ is a polyoxyalkylene moiety terminated with a hydroxyl or alkyl or aryl group;

$R_1$, $R_2$, $R_3$, $A_4$, and $R_5$ are independently selected from the group consisting of hydrogen, $C_1$-$C_{20}$ alkyl, $C_1$-$C_{20}$ alkoxy, and Q-E, wherein Q is a linking group selected from the group consisting of N, O, S, $SO_2$, $SO_3$, $CO_2$, $SO_2N$, alkyl, and alkoxy, and E is a polymer chain and end group that conforms to the structure of general formula (VI), as shown below:

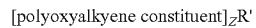

[polyoxyalkyene constituent]$_Z$R'    (VI)

wherein z is 1 or 2;
wherein the polyoxyalkylene constituent is selected from the group consisting of one or more monomers selected from a $C_{2-20}$ alkyleneoxy group, a glycidol group, a glycidyl group, or mixtures thereof;

wherein R' is an end group selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsulfonyl, $C_{1-20}$ alkylphenyl, phosphonyl, $C_{1-20}$ alkylphosphonyl, $C_{1-20}$ alkoxycarbonyl, and phenylthio; wherein at least one of $R_1$, $R_2$, $R_3$, $R_4$, $R_5$ is Q-E; and $A_5$-$A_8$ are independently selected from the group consisting of hydrogen, halogen, nitro, amino, alkylamino, arylamino moieties, and combinations thereof.

Preferably, Q is oxygen, E is a polyoxyalkylene moiety consisting of ethylene oxide and propylene oxide monomers, and z is 1.

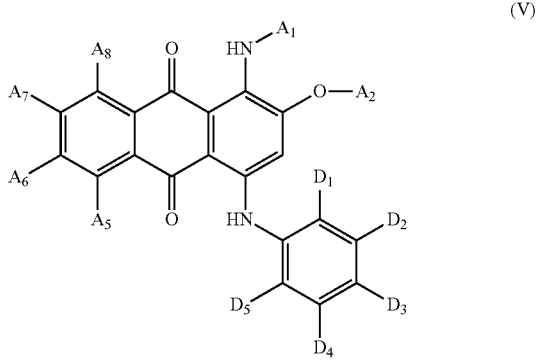

(V)

wherein:

$A_1$ is selected from the group consisting of hydrogen, alkyl, hydroxyalkyl, polyoxyalkylene, and aryl;

$A_2$ is a $C_1$-$C_{20}$ alkyl, phenyl or substituted phenyl, a polyoxyalkylene moiety terminated with a hydroxyl or alkyl or aryl or an aryl group further substituted by Y-$A_3$, wherein the aryl group is selected from phenylene or a substituted phenylene moiety;

Y is a linking group and is selected from the group consisting of oxygen, nitrogen, sulfonyl, sulfonamido, and carboxyl;

$A_3$ is a polyoxyalkylene moiety terminated with a hydroxyl or alkyl or aryl ether;

$D_1$-$D_5$ are the same or different and are selected from the group consisting of hydrogen, $C_1$-$C_{20}$ alkyl, $C_1$-$C_{20}$ alkoxy, and Q-E, wherein Q is a linking group selected from the group consisting of N, O, S, $SO_2$, $SO_3$, $CO_2$, $SO_2N$, alkyl, and alkoxy, and E is a polymer chain and end group that conforms to the structure of general formula (VI), as shown below:

wherein z is 1 or 2;
wherein the polyoxyalkylene constituent is selected from the group consisting of one or more monomers selected from a $C_{2-20}$ alkyleneoxy group, a glycidol group, a glycidyl group, or mixtures thereof;
wherein R' is an end group selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsulfonyl, $C_{1-20}$ alkylphenyl, phosphonyl, $C_{1-20}$ alkylphosphonyl, $C_{1-20}$ alkoxycarbonyl, and phenylthio; wherein at least one of $D_1$, $D_2$, $D_3$, $D_4$, $D_5$ is Q-E; and wherein $A_5$-$A_8$ are independently selected from the group consisting of hydrogen, halogen, nitro, amino, alkylamino, arylamino moieties, and combinations thereof.

Preferably, Q is oxygen, E is a polyoxyalkylene moiety consisting of ethylene oxide and propylene oxide monomers, and z is 1.

The inventive polymeric violet anthraquinone colorants are generally synthesized according to the procedures described herein. However, the rate of the reaction may be affected, for example, by the temperature, the specific raw materials, and the agitation rate employed. The progress of the reaction may be monitored by visible spectroscopy, Thin Layer Chromatography (TLC), and/or High Performance Liquid Chromatography (HPLC).

Synthesis of the inventive colorants can be achieved by several routes as illustrated by the following methods. All four methods below have in common the substitution of a leaving group at the 2 position of the anthraquinone moiety by a nucleophile. In order to generate the color desired, it is necessary to have a substituted amino group at the 4 position of the anthraquinone moiety. This may be achieved by reacting bromamine acid with a suitable arylamine as in Method 1 or with a polyoxyalkylene-substituted arylamine as in Method 2, or using an anthraquinone with a preformed 4-amino group as in Methods 3 and 4.

As discussed herein, polymeric alcohol compounds may be used to make the inventive polymeric violet anthraquinone colorants of the present invention. Polymeric alcohol compounds include any polymer with one or more hydroxyl group which can be used to react with the suitable anthraquinone compounds to make the inventive polymeric violet anthraquinone colorants. Polymeric alcohols include, but are not limited to, polyethylene glycols, polyethylene glycol monoethers, polyethylene glycol monoesters, polypropylene glycols and their monoesters and monoethers, star-shaped or multi-armed poly(ethylene oxide)s, copolymers of ethylene glycol and propylene glycol, polyglycidols, polyglycidyl ethers, polyvinyl alcohols, polyacrylate and polymethylacrylate homopolymers or copolymers with hydroxyl group(s), hydroxyl terminated polybutadiene, polyether polyols, polyester polyols, hydroxyl terminated polydimethylsiloxane, hydroxyl terminated polyamines like ethoxylated polyethylenimine, polyethylene mono-alcohols, polyethylene-block-poly(ethylene glycol)s, polyoxyethylene alkyl ethers, and polytetrahydrofurans. Preferably, the polymeric alcohols are polymers having ethylene glycol, propylene glycol, or glycidyl ether as repeating units.

Commercially available examples of polymeric alcohols include alcohol ethoxylates from Air Products including Tomadol® 45-13, Tomadol® 25-7, Tomadol® 1-9, Tomadol® 23-5, Tomadol® 91-6 and Tomadol® 45-7; polyethylene glycols from Dow including Carbowax® PEG 200, Carbowax® PEG 300 and Carbowax® PEG 400; methoxypolyethylene glycols (MPEGs) from Dow including Carbowax™ MPEG 350 and Carbowax™ MPEG 550; alkoxylated polyols from Perstorp including Polyol 3165, Polyol 4800, Polyol R2490 and Polyol R6405.

Polymeric phenols refer generally to any polymer with phenol or substituted phenol moieties as the end group. The general structure of such polymer is HO—Ph—R', wherein R' is the polymer chain and Ph is a benzene ring or a substituted benzene ring. Mercaptan terminated polymers generally refer to any polymer having an —SH as the end group.

Method 1

One method for making the polymeric violet anthraquinone colorant of the present invention involves a two step reaction. The first step consists of reacting bromamine acid with a polyoxyalkylene substituted primary aromatic or aliphatic amine catalyzed by metallic copper, cupric (Cu (II)), or cuprous (Cu (I)) ions, also known as an Ullmann condensation reaction, and as further described on page 501 to 502 of "March's Advanced Organic Chemistry: Reactions, Mechanisms, and Structure" by Michael B. Smith and Jerry March, 5$^{th}$ Edition, 2001 and the references contained therein. The resulting anthraquinone intermediate is 1-amino-4-arylamino-2-anthraquinone sulfonic acid.

The second step consists of reacting the 1-amino-4-arylamino-2-anthraquinone sulfonic acid with an alcohol, a polymeric alcohol, a thiol, or a polymeric thiol and with a base, which results in displacement of the sulfonic acid group to yield the 2-alkoxy derivative, a violet chromophore. This reaction is shown below:

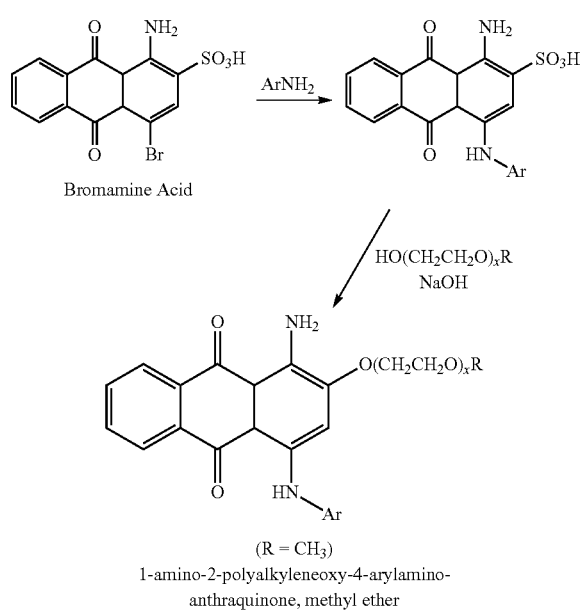

(R=CH₃)
1-amino-2-polyalkyleneoxy-4-arylamino-
anthraquinone, methyl ether (R=CH₃) 1-amino-2-polyalkyleneoxy-4-arylamino-anthraquinone, methyl ether The polyoxyalkylene substituted primary aromatic amines used in this method may be represented by general structure (VII):

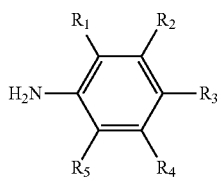

(VII)

wherein $R_1$, $R_2$, $R_3$, $R_4$, $R_5$ are the same or different and are selected from the group consisting of hydrogen, $C_1$-$C_{20}$ alkyl, $C_1$-$C_{20}$ alkoxy, halogen, nitro, amino, carboxylic acid, carboxylic acid ester, carboxamide, sulfonic acid, sulfonamide and sulfonic acid esters. The first step of this method, the bromamine acid reaction with the polyoxyalkylene substituted primary aromatic or aliphatic amine, typically employs a copper catalyst as mentioned above. Examples of this catalyst include CuCl, $CuCl_2$, Cu powder, or $CuSO_4$. A solvent, such as alcohol (such as methanol, ethanol, propylene glycol, or glycerol), dimethylformamide (DMF), dimethylsulfoxide (DMSO), and the like, may optionally be utilized. A mild base may be used, such as sodium carbonate, sodium bicarbonate, and the like. The typical reaction temperature is between 60° C. and 150° C.

The second step of this method consists of heating the 1-amino-4-arylamino-2-anthraquinonesulfonic acid and an OH or SH terminated polymer with a base to 50° C. to 250° C. in a reactor with optional solvent. Preferably, the reaction temperature is from 50° C. to 150° C. More preferably, the reaction temperature is from 70° C. to 120° C. A strong base is typically needed for this reaction. Alkali hydroxides can be used, such as sodium hydroxide, potassium hydroxide, or lithium hydroxide. Alkali alkoxides also may be used, such as sodium methoxide, sodium butoxide, or potassium isopropoxide. Other useful bases include, but are not limited to, sodium hydride, sodium amide, sodium bis(trimethylsilyl) amide, tetramethylammonium hydroxide (TMAH), benzyltrimethylammonium hydroxide (BTMAH), lithium diisopropylamide, sodium trimethylsilanolate. Solvent for this reaction may be water, alcohols, ethers, toluene, dimethylsulfoxide (DMSO), dimethylformamide (DMF), and the like. The use of a solvent is optional. Solvent may be used to help dissolve the reactants/products or reduce the viscosity of the reaction mixtures.

Method 2

Another method of synthesizing the polymeric violet anthraquinone colorant involves reacting a polyoxyalkylene substituted primary aromatic or aliphatic amine with bromamine acid, followed by treatment of the anthraquinone intermediate obtained with an alcohol or glycol compound and a base. This method is illustrated below:

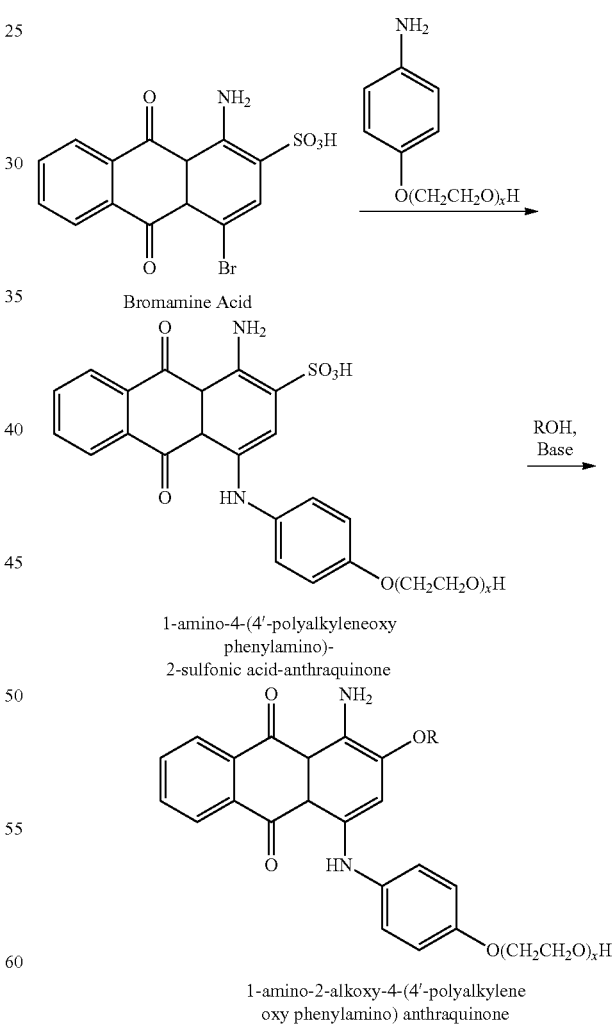

The polyoxyalkylene substituted primary aromatic amines with polyoxyalkylene chains have general structure (VIII), as described in U.S. Pat. No. 6,593,482, and as shown below:

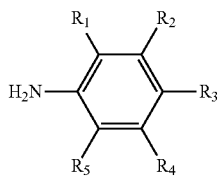

(VIII)

wherein R₁, R₂, R₃, R₄, R₅ are the same or different and are selected from the group consisting of hydrogen, $C_1$-$C_{20}$ alkyl, $C_1$-$C_{20}$ alkoxy, and Q-E, wherein Q is a linking group selected from the group consisting of N, O, S, $SO_2$, $SO_3$, $CO_2$, $SO_2N$, alkyl, and alkoxy, and E is a polymer chain and end group that conforms to the structure of general structure formula (IX), as shown below:

[polyoxyalkyene constituent]$_z$R'  (IX)

wherein z is 1 or 2;
wherein polyoxyalkylene constituent is selected from the group consisting of one or more monomers selected from a $C_{2-20}$ alkyleneoxy group, a glycidol group, a glycidyl group, or mixtures thereof;
wherein R' is an end group selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsulfonyl, $C_{1-20}$ alkylphenyl, phosphonyl, $C_{1-20}$ alkylphosphonyl, $C_{1-20}$ alkoxycarbonyl, and phenylthio; and wherein at least one of R₁, R₂, R₃, R₄, R₅ is Q-E.

Preferably, Q is oxygen, E is a combination of ethylene oxide and propylene oxide, and z is 1.

The alcohol reactant used in the second step to replace the sulfonic acid moiety on the anthraquinone may be an alcohol, such as methanol, ethanol, propylene glycol, glycerol, a polyol, the monoether of a polyol, or the like. Phenol or substituted phenols also may be used. The base and reaction conditions used are the same as those described in Method 1.

Method 3

One can directly treat an anthraquinone acid blue compound having a sulfonic acid moiety in the 2 position, e.g. 1-amino-4-arylamino-2-anthraquinone sulfonic acid or monosodium salt, such as Acid Blue 145, with a polymeric alcohol and a base compound as shown by the reaction below:

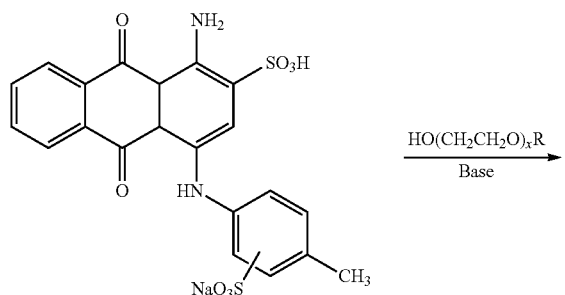

Acid Blue 145

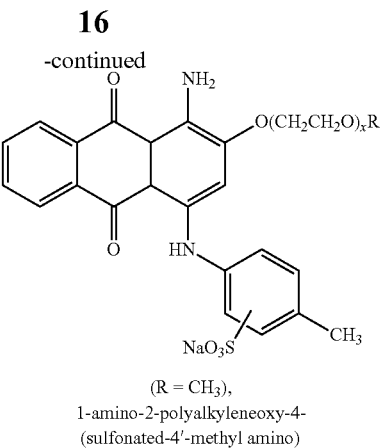

(R = CH₃),
1-amino-2-polyalkyleneoxy-4-
(sulfonated-4'-methyl amino)
anthraquinone, methyl ether The reaction conditions are those described in Step 2 of Method 1.

Examples of suitable acid blue dyes which may be used to make the inventive polymeric violet colorants of the present invention include Color Index Acid Blue 23, Acid Blue 25, Acid Blue 41, Acid Blue 53, Acid Blue 62, Acid Blue 68, Acid Blue 69, Acid Blue 111, Acid Blue 124, Acid Blue 127, Acid Blue 129, Acid Blue 138, Acid Blue 150, Acid Blue 230, Acid Blue 277, and Acid Blue 344. Also, reactive blue dyes may be used to make the inventive polymeric violet colorants if there is an —$SO_3H$ moiety on the β position of the anthraquinone backbone. The following are examples of such suitable reactive blue dyes: Reactive Blue 2, Reactive Blue 4, Reactive Blue 5, Reactive Blue 19, Reactive Blue 27, Reactive Blue 29, Reactive Blue 36, Reactive Blue 49, Reactive Blue 50, Reactive Blue 69, Reactive Blue 74, Reactive Blue 94, and Reactive Blue 166.

Method 4

One also can use 1-amino-4-arylamino-2-haloanthraquinone to make the inventive polymeric anthraquinone. In this instance, the 2-position of the anthraquinone is substituted by a halogen, such as fluorine, chlorine, bromine, and iodine. Preferably, the halogen is chlorine or bromine. The compound, 1-amino-4-arylamino-2-haloanthraquinone, reacts with a polymeric alkali metal alkoxide or phenoxide at a temperature range of about 80° C. to about 200° C. in a non-aqueous medium to give the product illustrated in Formula IV. Examples of such halogen substituted anthraquinone colorants include acid blue, disperse blue and solvent blue dyes. Specific examples of such dyes include Acid Blue 78, Acid Blue 81, Acid Blue 96, Disperse Blue 56, Disperse Blue 81, and Solvent Blue 12.

Additionally, a violet polymeric anthraquinone colorant having general structure (X) may be made according to one or more of the methods described herein:

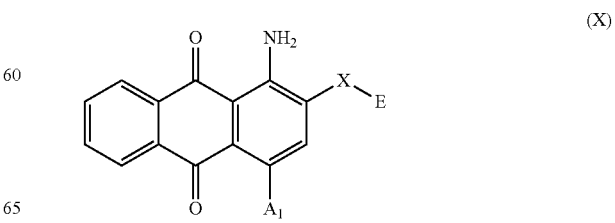

wherein $A_1$ is selected from $NH_2$, OH, or hydrogen; X is selected from O, S, $CH_2$, OPh or OPhO groups; E conforms to the general formula:

[polyoxyalkyene constituent]$_z$R';

wherein z is 1 or 2;
wherein polyoxyalkylene constituent is selected from the group consisting of one or more monomers selected from a $C_{2-20}$ alkyleneoxy group, a glycidol group, a glycidyl group, or mixtures thereof; and
wherein R' is an end group selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsulfonyl, $C_{1-20}$ alkylphenyl, phosphonyl, $C_{1-20}$ alkylphosphonyl, $C_{1-20}$ alkoxycarbonyl, and phenylthio.

Examples of violet polymeric anthraquinone colorants made according to according to one or more of the methods described herein are shown below and have general structures (XI), (XII) or (XIII):

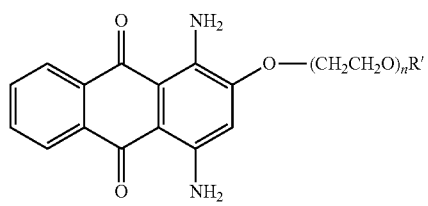

(XI)

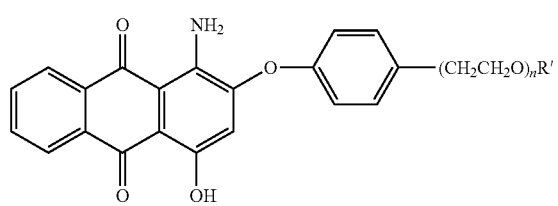

(XII)

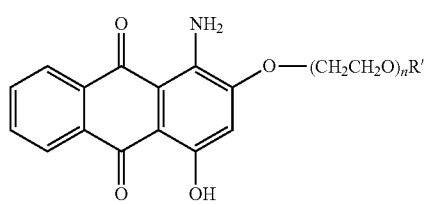

(XIII)

wherein the average n=3 to 100; and
wherein R' is an end group selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsulfonyl, $C_{1-20}$ alkylphenyl, phosphonyl, $C_{1-20}$ alkylphosphonyl, $C_{1-20}$ alkoxycarbonyl, and phenylthio.

In general, the inventive polymeric violet anthraquinone colorants have excellent compatibility with the target formulations to which they are added. Furthermore, the polymeric violet anthraquinone colorants may be tailored to be miscible with the intended systems. The inventive polymeric violet anthraquinone colorants have excellent colorations, low extraction, thermal stability, and lightfastness within target thermoplastic and/or thermoset articles. The violet polymeric colorants contain poly(oxyalkylene) groups that are easy to process, which mix well within target plastics, and which provide excellent colorations within the target finished articles.

The inventive polymeric violet anthraquinone colorants as described herein are preferably water soluble. More specifically, the colorants are preferably water soluble at concentrations which provide sufficient coloration for a desired end-use application. Furthermore, the polymeric violet anthraquinone colorants of the present invention are preferably water fugitive (i.e. washable from substrates with water) on all kinds of substrates, such as, for example, human skin, textile substrates, coated surfaces (such as, for example, painted surfaces), ceramic surfaces, etc. Also, the inventive polymeric violet anthraquinone colorants are generally liquid or semi-solid at ambient conditions. "Semi-solid" generally means the colorant is a highly viscous liquid, or may even be paste-like, and its melting temperature, if it has any, is typically below about 60° C.

There are several advantages to polymeric violet anthraquinone colorants made according to these methods. First, these colorants are generally more soluble in water than other colorants. They are generally pH stable and non-staining, which allows for their use in many consumer products, such as laundry detergents and other cleaning products. Additionally, these colorants have a wider range of compatibility with other materials. This allows for ease of incorporation of the colorants into these other materials. Thus, the polymeric violet anthraquinone colorants represent a useful advance over the prior art.

Additionally, the polymeric violet anthraquinone colorants of the present invention generally possess many desirable and advantageous properties for use in various consumer products. The colorants generally have good alkali fastness. They can typically be used in high pH formulations, such as wherein the pH is between about 8 and about 13, without having stability problems. Such pH ranges are often found in powder detergents, heavy-duty liquid detergents, hard surface cleaners, etc. Additionally, these anthraquinone colorants may exhibit desirable color brightness due to fluorescence of the anthraquinone chromophore. As such, these anthraquinone colorants may be used to color various personal care, home care, and fabric care products. For example, the colorants may be used to color soap bars, liquid soaps, fabric softeners, car washing formulations, glass cleaners, toilet cleaners, shampoos, and the like. Examples of specific laundry detergent formulations (both granular and liquid), which may be suitable for use with the anthraquinone of the present invention, are disclosed in commonly assigned U.S. Pat. No. 5,770,552 to Bruhnke. Examples of specific fabric softener formulations, which may be suitable for use with the anthraquinone of the present invention, are disclosed in U.S. Pat. No. 5,770,557 to Bruhnke.

The polymeric violet anthraquinone colorants can also be used in industrial formulations, such as heavy-duty industrial cleaners and detergents and fertilizers. Additionally, it is contemplated that the colorants of the current invention may be ideal for use in coloring thermoplastic materials (such as, for example, polyolefin and polyester) and thermoset materials (such as, for example, polyurethane foam). Examples of specific thermoplastic formulations, which may be suitable for use with the anthraquinone of the present invention, are disclosed in U.S. Pat. Nos. 4,640,690; 4,732,570; and 4,812,141 to Baumgartner et al.

Examples of specific thermoset formulations, which may be suitable for use with the anthraquinone of the present invention, are disclosed in commonly assigned U.S. Pat. No. 4,284,729 to Cross et al. and U.S. Pat. No. 4,846,846 to Rekers et al. In general, polyurethane foam is produced through the catalyzed polymerization of the reaction products of polyols and isocyanates. Blowing agents present within the polymerization step typically provide the necessary foam-making capability. Such a reaction is well known throughout the polyurethane industry and has been practiced for many years.

It is also contemplated to be within the scope of this invention that a large variety of colors and shades may be obtained by blending the inventive polymeric violet anthraquinone colorant with one or more additional water soluble colorants. Blending of the colorants may be readily accomplished, for example, when combining colorants having substantially identical solubility characteristics. Several exemplary classes of colorants include the Reactint® and Liquitint® colorants (available from Milliken Chemical of Spartanburg, S.C.). These colorants are generally water soluble, or dispersible, at room temperature and may be suitably blended with the anthraquinone colorant of the present invention to achieve improved colors and shades.

EXAMPLES

The following examples are provided for illustration purposes and should not be considered as limiting the scope of the invention.

All color values and absorbance values were measured using a Beckman DU 650 spectrophotometer. Generally, the higher the color value, the stronger the colorant. All values and percentages are provided based on 100 percent solids, unless otherwise indicated.

Example 1

A mixture was prepared containing 9.17 grams of Acid Blue 129, 2.4 grams of 50% sodium hydroxide solution and 30.0 grams of poly(ethylene glycol) mono methyl ether (having molecular weight=550). The mixture was heated to 100° C. for 3 hours. TLC analysis was used to confirm that all of the Acid Blue 129 had reacted. 10 mL of water was then added, and the reaction mixture was neutralized to pH 7 with muriatic acid. The resulting product was a liquid polymeric violet anthraquinone colorant with an absorption maximum in methanol at 584 nm. The structure of the resulting product is shown below:

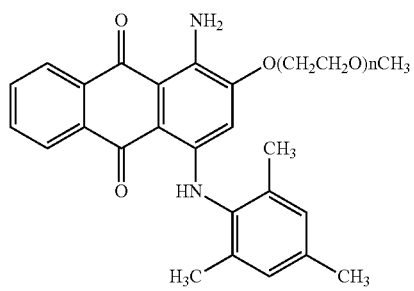

Average n = 12
1-amino-2-polyalkyleneoxy-4-(2,4,6-trimethyl phenylamino) anthraquinone Example 2

Example 1 was repeated, except that the 50% sodium hydroxide solution was replaced with 3.0 grams of sodium tert-butoxide powder. A liquid polymeric violet anthraquinone colorant having the same name, structure, and absorption value as shown in Example 1 was obtained.

Example 3

A mixture was prepared that contained 8.3 grams of Acid Blue 25, 2.4 grams of 50% aqueous sodium hydroxide solution and 30.0 grams of polyethylene glycol) mono methyl ether (molecular weight=550). The mixture was heated to 100° C. for 3 hours. TLC analysis was used to confirm that all of the Acid Blue 25 was reacted. 20 mL of water was then added, and the reaction mixture was neutralized to pH 7 with hydrochloric acid. The resulting product was a liquid polymeric violet anthraquinone colorant with absorption maximum in methanol at 588 nm. The structure of the resulting product is shown below:

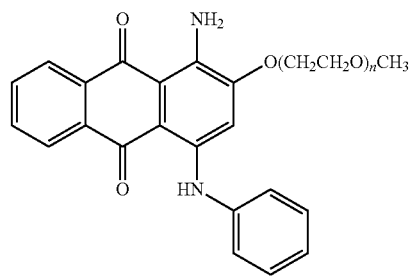

Average n = 12
1-amino-2-polyalkyleneoxy-4-phenylamino anthraquinone

Example 4

A mixture of 524 grams of Tomadol® 25-7 (from Air Products), 36 grams of sodium tert-butoxide (from BASF) and 116 grams of Acid Blue 129 was heated to 100° C. while stirring in a reaction flask for 3 hours. TLC analysis was used to confirm that all of the Acid Blue 129 was reacted. 660 grams of the reaction mixture was collected. The reaction mixture contained a liquid polymeric violet anthraquinone colorant having a maximum absorption in methanol of 584 nm.

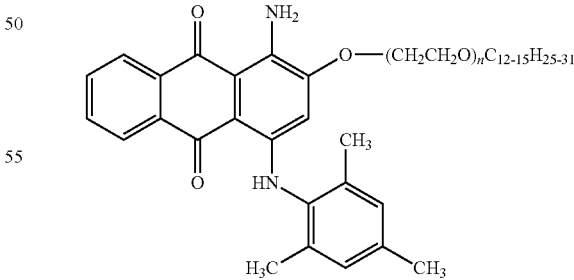

Average n = 7
1-amino-2-alkoxy-polyethyleneoxy-4-(2,4,6-trimethylphenylamino) anthraquinone The polymeric violet anthraquinone colorant was subsequently incorporated into a wax based candle formulation at 0.3% weight loading. The colored candle exhibited an excellent uniform violet shade.

Example 5

A mixture of 0.8 grams of NaOH pellet, 7.5 grams of glycerol 15 EO and 1.0 grams of Acid Blue 25 was charged into a 3-neck flask equipped with agitator, temperature probe and condenser. The reaction mixture was heated to 110° C. for 2 hours. TLC analysis confirmed that all of the Acid Blue 25 was consumed. The reaction mixture contained the liquid violet polymeric anthraquinone colorant having a maximum absorption in methanol of 572 nm.

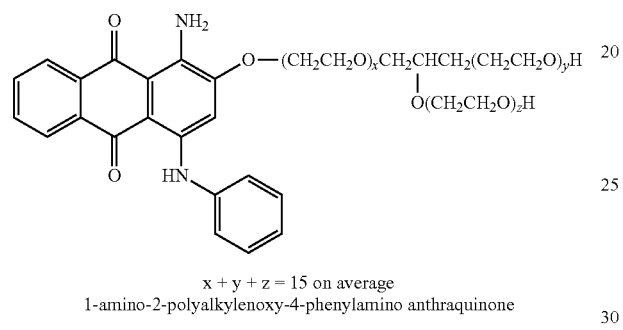

x + y + z = 15 on average
1-amino-2-polyalkylenoxy-4-phenylamino anthraquinone

Example 6

13.7 grams of Aniline PEG 10EO, 8.1 grams of bromamine acid sodium salt, 5.0 grams of sodium bicarbonate, 0.1 grams of cuprous chloride were charged into 50 grams of water in a reaction flask equipped with stirrer, temperature probe, and a condenser. The reaction mixture was heated to reflux and stirred overnight. The reaction mixture turned blue. After evaporation and removing salts by filtering the methanol solution, a crude product having an absorption maximum in methanol of 624 nm was obtained.

4.0 grams of the product from above was mixed with 30 grams of methanol and 10 grams of 50% caustic solution. The mixture was heated to 78° C. for 3 hours and a liquid polymeric violet anthraquinone colorant was obtained. The colorant exhibited a maximum absorption of 587 nm in methanol. This reaction and the structure thus obtained are shown below:

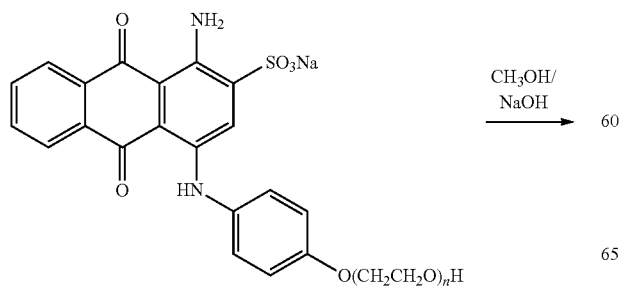

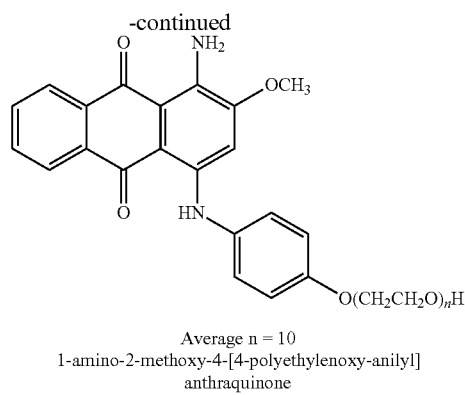

Average n = 10
1-amino-2-methoxy-4-[4-polyethylenoxy-anilyl] anthraquinone

Example 7

4.0 grams of PEG 200, 4.2 grams of Acid Blue 25 and 20 gram of 50% caustic were charged into a three neck reaction flask equipped with condenser, temperature control, thermometer and agitator. The mixture was heated to 100° C. for 2 hours. TLC analysis was used to confirm that the blue colorant was no longer present. The reaction mixture was then neutralized with a 10% sulfuric acid solution. The reaction mixture contained the liquid polymeric violet anthraquinone colorant exhibited a maximum absorption of 569 nm in water. The liquid polymer violet anthraquinone colorant had the following structure:

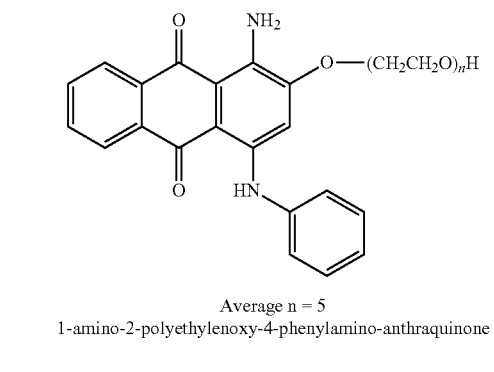

Average n = 5
1-amino-2-polyethylenoxy-4-phenylamino-anthraquinone

Test 1: pH Stability of Example 1

This test is provided to illustrate the pH stability of the polymeric violet anthraquinone colorant of Example 1.

100 ppm of the polymeric violet colorant from Example 1 was added to various pH buffer solutions. The colored buffer solutions were put into a 50° C. oven for 10 days and the shade of the final colored solutions was compared with the initial solutions using a spectrometer GretagMacbeth™ Color-Eye 7000A spectrophotometer. Test results are provided in Table 1.

TABLE 1 pH Stability of Example 1

| Buffer Solution | Delta E value after 10 days at 50° C. oven |
| --- | --- |
| pH 2.0 buffer | 0.896 |
| pH 4.0 buffer | 1.018 |

TABLE 1-continued pH Stability of Example 1

| Buffer Solution | Delta E value after 10 days at 50° C. oven |
|---|---|
| pH 6.0 buffer | 0.340 |
| pH 8.0 buffer | 0.346 |
| pH 12.45 buffer | 5.178 |

The test results illustrate that the inventive polymeric violet anthraquinone colorants exhibit good pH stability.

Test 2: pH Stability of Example 6

This test is provided to illustrate the pH stability of the polymeric violet anthraquinone colorant of Example 6.

The same procedure utilized in Test 1 was followed for testing the polymeric anthraquinone violet colorant of Example 6, except that the colorant was evaluated after two weeks and after 4 weeks. Test results are provided in Table 2.

TABLE 2 pH Stability of Example 6

| Buffer Solution | Delta E after 2 weeks at 50° C. | Delta E after 4 weeks at 50° C. |
|---|---|---|
| pH 2.0 buffer | 2.082 | 3.386 |
| pH 12.45 buffer | 2.398 | 4.321 |

Test 3: Stain Testing of Example 1

This test is provided to illustrate the non-staining feature of the polymeric violet anthraquinone of Example 1.

30 ppm of the polymeric violet anthraquinone colorant of Example 1 was added to a standard liquid laundry detergent. 127 ppm of the polymeric violet anthraquinone colorant of Example 1 was added to a fabric softener formulation. Each colorant-containing formulation was evaluated for staining on several different fabric swatches comprised of different fiber types. The stain evaluation was performed by visual observation according to the rating system for AATCC Grey Scale No. 2 "Grey Scale For Staining." A rating of "5" indicates no staining was observed. A rating of "1" indicates high degree of staining was present.

Test results are provided in Table 3.

TABLE 3

Stain Testing of Example 1

| Sample | AATCC Stain Rating in Laundry Detergent | AATCC Stain Rating in Fabric Softener |
|---|---|---|
| Spun Diacetate | 5 | 5 |
| Bleached Cotton | 5 | 3/4 |
| Nylon 6,6 (Polyamide) | 5 | 5 |
| Dacron 54 (Polyester) | 5 | 5 |
| Orlon 75 (Acrylic) | 5 | 5 |
| Wool | 5 | 5 |
| Terry Cotton | 5 | 3/4 |

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

We claim:

1. A polymeric violet anthraquinone colorant comprising a compound represented by structure (IV-A):

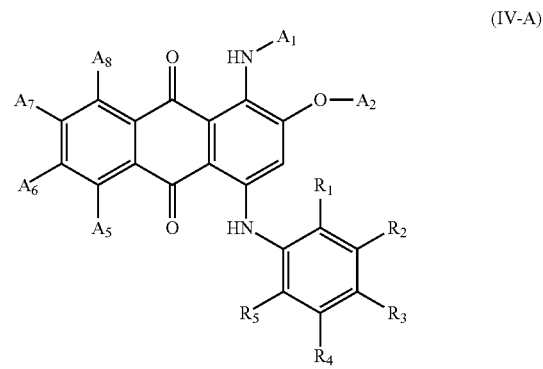

(IV-A)

wherein:
$A_1$ is selected from the group consisting of hydrogen, alkyl, hydroxyalkyl, polyoxyalkylene, and aryl;

$A_2$ is selected from the group consisting of alkyl or aryl having no polymer chains; a polyoxyalkylene moiety or an aryl linked polyoxyalkylene moiety with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl;

$A_3$ is a polyoxyalkylene moiety terminated with a hydroxyl or alkyl or aryl group; and $R_1$, $R_2$, $R_3$, $R_4$, and $R_5$ are independently selected from the group consisting of hydrogen, $C_1$-$C_{20}$ alkyl, $C_1$-$C_{20}$ alkoxy, and Q-E, wherein Q is a linking group selected from the group consisting of N, O, S, $SO_2$, $SO_3$, $CO_2$; $SO_2N$, alkyl, and alkoxy, and E is a polymer chain and end group that conforms to the structure of general formula (VI), as shown below:

$$[\text{polyoxyalkyene constituent}]_z R' \qquad (VI)$$

wherein z is 1 or 2;

wherein the polyoxyalkylene constituent is selected from the group consisting of one or more monomers selected from a $C_{2-20}$ alkyleneoxy group, a glycidol group, a glycidyl group, or mixtures thereof;

wherein R' is an end group selected from the group consisting of hydrogen, $C_{1-20}$ alkyl, $C_{1-20}$ alkylester, halo, hydroxyl, thio, cyano, sulfonyl, sulfo, sulfato, aryl, nitro, carboxyl, $C_{1-20}$ alkoxy, amino, $C_{1-20}$ alkylamino, acrylamino, $C_{1-20}$ alkylthio, $C_{1-20}$ alkylsulfonyl, $C_{1-20}$ alkylphenyl, phosphonyl, $C_{1-20}$ alkylphosphonyl, $C_{1-20}$ alkoxycarbonyl, and phenylthio; wherein at least one of $R_1$, $R_2$, $R_3$, $R_4$, $R_5$ is Q-E; and $A_5$-$A_8$ are independently selected from the group consisting of hydrogen, halogen, nitro, amino, alkylamino, arylamino moieties, and combinations thereof.

2. A polymeric violet anthraquinone colorant comprising a compound represented by structure (II):

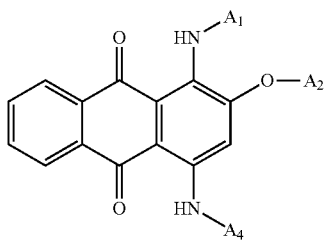

(II)

wherein:
$A_1$ is selected from the group consisting of hydrogen, alkyl, hydroxyalkyl, polyoxyalkylene, and aryl;
$A_2$ is selected from the group consisting of alkyl or aryl having no polymer chains; a polyoxyalkylene moiety, or an aryl linked polyoxyalkylene moiety, with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl; $A_3$ is a polyoxyalkylene moiety terminated with a hydroxyl or alkyl or aryl group; and
$A_4$ is an aryl group substituted with a polyoxyalkylene constituent wherein the polyoxyalkylene constituent is selected from the group consisting of one or more monomers selected from a $C_{2-20}$ alkyleneoxy group, a glycidol group, a glycidyl group, or mixtures thereof.

3. A polymeric violet anthraquinone colorant comprising a compound represented by structure (III):

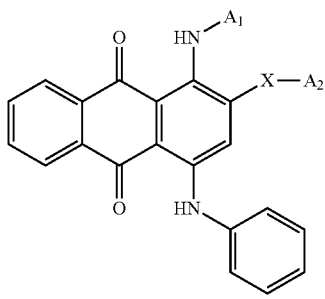

(III)

wherein:
$A_1$ is selected from the group consisting of hydrogen, alkyl, hydroxyalkyl, polyoxyalkylene, and aryl;
X is a linking group and is selected from the group consisting of oxygen and sulfur; and $A_2$ is selected from the group consisting of a polyoxyalkylene moiety, or an aryl linked polyoxyalkylene moiety, with greater than three repeating units and terminated with a hydroxyl or alkyl or aryl; and an aryl group further substituted by Y-$A_3$ wherein the aryl group is selected from phenylene or a substituted phenylene moiety; Y is a linking group and is selected from the group consisting of oxygen, nitrogen, sulfonyl, sulfonamido, and carboxyl; and $A_3$ is a polyoxyalkylene moiety terminated with a hydroxyl or alkyl or aryl group.

4. A polymeric violet anthraquinone colorant comprising a compound represented by structure (IV):

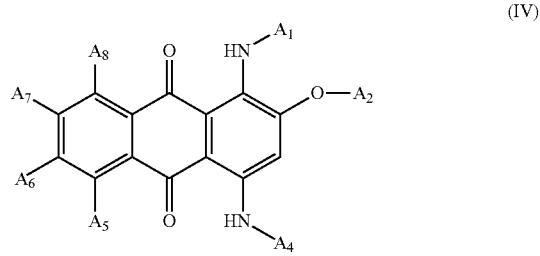

(IV)

wherein:
$A_1$ is selected from the group consisting of hydrogen, alkyl, hydroxyalkyl, polyoxyalkylene, and aryl;
$A_2$ is selected from the group consisting of alkyl or aryl having no polymer chains; a polyoxyalkylene moiety or an aryl linked polyoxyalkylene moiety with greater than three repeating units and terminated with a hydroxyl or alkyl or aryl; and an aryl group further substituted by Y-$A_3$ wherein the aryl group is selected from phenylene or a substituted phenylene moiety: Y is a linking group and is selected from the group consisting of oxygen, nitrogen, sulfonyl, sulfonamido, and carboxyl;
$A_3$ is a polyoxyalkylene moiety terminated with a hydroxyl or alkyl or aryl group:
$A_4$ is an aryl group substituted with a polyoxyalkylene constituent wherein the polyoxyalkylene constituent is selected from the group consisting of one or more monomers selected from a $C_{2-20}$ alkyleneoxy group, a glycidol group, a glycidyl group, or mixtures thereof; and
$A_5$-$A_8$ are independently selected from the group consisting of hydrogen, halogen, nitro, amino, alkylamino, arylamino moieties, and combinations thereof.

5. The colorant of claim 1, wherein Q is oxygen, E is a polyoxyalkylene moiety consisting of ethylene oxide and propylene oxide monomers, and z is 1.

6. The colorant of claim 2, wherein the polyoxyalkylene constituent is a $C_{2-20}$ alkyleneoxy group.

7. The colorant of claim 4, wherein the polyoxyalkylene constituent is a $C_{2-20}$ alkyleneoxy group.

* * * * *